(12) United States Patent
Huang et al.

(10) Patent No.: US 6,430,312 B1
(45) Date of Patent: Aug. 6, 2002

(54) IMAGE SUBREGION QUERYING USING COLOR CORRELOGRAMS

(75) Inventors: Jing Huang, Ossining, NY (US); Shanmugasundaram Ravi Kumar, San Jose, CA (US); Mandar Mitra, Calcutta (IN); Wei-Jing Zhu, Ossining, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 09/221,473

(22) Filed: Dec. 28, 1998

Related U.S. Application Data (60) Provisional application No. 60/068,915, filed on Dec. 29, 1997, and provisional application No. 60/089,684, filed on Jun. 17, 1998.

(51) Int. Cl.[7] .................................................. G06K 9/00
(52) U.S. Cl. ........................................ 382/165; 382/162
(58) Field of Search ................................. 382/162–172, 382/173, 191–198, 201, 205, 209, 278, 285, 293, 295, 305, 309

(56) References Cited

U.S. PATENT DOCUMENTS

| | | | |
|---|---|---|---|
| 4,962,540 A | 10/1990 | Tsujiuchi et al. | 382/17 |
| 4,979,225 A | 12/1990 | Tsujiuchi et al. | 382/17 |
| 4,998,286 A | 3/1991 | Tsujiuchi et al. | 382/34 |
| 5,105,466 A | 4/1992 | Tsujiuchi et al. | 382/1 |
| 5,247,583 A | 9/1993 | Kato et al. | 382/9 |
| 5,343,538 A | 8/1994 | Kasdan | 382/18 |
| 5,363,454 A | 11/1994 | Udagawa et al. | 382/17 |
| 5,537,488 A | 7/1996 | Menon et al. | 382/170 |
| 5,565,962 A | 10/1996 | Yoshimoto | 355/201 |
| 5,583,614 A | 12/1996 | Hasuo et al. | 355/201 |
| 5,586,197 A | 12/1996 | Tsujimura et al. | 382/162 |
| 5,608,820 A | 3/1997 | Vaidyanathan | 382/169 |
| 5,630,037 A | 5/1997 | Schindler | 395/131 |
| 5,633,952 A | 5/1997 | Outa et al. | 382/165 |
| 5,644,765 A | 7/1997 | Shimura et al. | 395/615 |
| 5,652,881 A | 7/1997 | Takahashi et al. | 395/615 |
| 5,689,575 A | 11/1997 | Sako et al. | 382/118 |
| 5,828,779 A | 10/1998 | Maggioni | 383/165 |
| 5,845,009 A | 12/1998 | Marks et al. | 382/228 |
| 5,963,203 A | * 10/1999 | Goldberg et al. | 345/328 |
| 6,043,909 A | * 3/2000 | Holub | 358/504 |
| 6,181,817 B1 | * 1/2001 | Zabih et al. | 382/170 |
| 6,246,790 B1 | * 6/2001 | Huang et al. | 382/162 |

OTHER PUBLICATIONS

Huang et al. (IEEE, 1997), Image Indexing Using Color Correlograms.*
Stricker et al. (IEEE, 1994), The Capacity of Color Histogram Indexing.*
Pass et al. (IEEE, 1996), Histogram Refinement for Content–Based Image Retrieval.*
Rickman et al. (IEEE, 1996), Content–Based Image Retrieval Using Colour N–Grams.*
Matas, J.; Marik, R.; Kittler, J. "On representation and matching of multi–coloured objects" Computer Vision, 1995. Proceedings, Fifth International Conference, pp. 726–732, Jun. 20–23, 1995.

(List continued on next page.)

*Primary Examiner*—Phuoc Tran
*Assistant Examiner*—Amir Alavi
(74) *Attorney, Agent, or Firm*—Perkins, Smith & Cohen, LLP; Jacob N. Erlich; Christine M. Kuta (57) ABSTRACT

A color correlogram (10) is a representation expressing the spatial correlation of color and distance between pixels in a stored image. The color correlogram (10) may be used to distinguish objects in an image as well as between images in a plurality of images. By intersecting a color correlogram of an image object with correlograms of images to be searched, those images which contain the objects are identified by the intersection correlogram.

18 Claims, 4 Drawing Sheets

OTHER PUBLICATIONS

Kim, J–W., "Color Image Segmentation by Detecting Three Dimensional Clusters of RGB Components," Journal of the Korea Information Science Society, Nov. 1993, vol. 20, No. 11. Abstract only.

Lupitani, G. et al., "Scene Break Detection: A Comparison," Research Issues in Data Engineering, Feb. 24, 1998, pp. 34–41.*

* cited by examiner

IMAGE SUBREGION QUERYING USING COLOR CORRELOGRAMS

CROSS REFERENCE TO RELATED APPLICATIONS

This application claims priority of U.S. provisional applications Serial No. 60/068,915 entitled, "Technique for Image Subregion Querying" filed Dec. 29, 1997 by the present applicants, and Serial No. 60/089,684, entitled "Image Indexing Using Color Correlograms" filed Jun. 17, 1998 by the present applicants.

This application is also related to co-pending application Ser. No. 09/221,472, entitled, "Image Indexing Using Color Correlograms" by the present applicants.

STATEMENT OF GOVERNMENT INTEREST

This invention was partially funded by the Government under a grant from DARPA/ARL, ONR Young Investigator Award N00014-93-1-0590, NSF grants DMI-91157199 and IRI 93-00124, career grant CCR-9624552, and DOE grant DEFG02-89ER45405. The Government has certain rights in portions of the invention.

BACKGROUND OF THE INVENTION

This invention relates generally to data management, and, more particularly to retrieving specific portions of images using color correlograms.

With the rapid proliferation of the Internet and the Worldwide Web, the amount of digital image data accessible to users has grown enormously. Image databases are becoming larger and more widespread, and there is a growing need for effective and efficient image retrieval systems. Image retrieval systems are systems that extract from a large collection of images ones that are "similar" to an image of interest to the user. Most existing image retrieval systems adopt the following two-step approach to search image databases: (i) indexing: for each image in the database, a feature vector capturing certain essential properties of the image is computed and stored in a featurebase, and (ii) searching: given a query image, its feature vector is computed, compared to the feature vectors in the featurebase, and images most similar to the query image are returned to the user.

For a retrieval system to be successful, the feature defined for an image should have certain desirable qualities: (i) the difference between pre-selected features of two images should be large if and only if the images are not "similar", (ii) the feature should be fast to compute, and (iii) the size of the feature should be small.

While most image retrieval systems retrieve images based on overall image comparison, users are typically interested in target searching such as in a database of images or in video browsing. In target searching, the user specifies a subregion (usually an interesting object) of an image as a query. For example, a user might wish to find pictures in which a given object appears, or scenes in a video with a given appearance of a person. In response to the user's query, the system should then retrieve images containing this subregion, or object from the database. This task, called image subregion querying, is made challenging by the wide variety of effects, such as different viewing positions, camera noise and variation, and object occlusion, that cause the same object to have a different appearance in different images.

Color histograms are commonly used as feature vectors for image retrieval and for detecting cuts in video processing because histograms are efficient to compute and insensitive to camera motions. Histograms are not robust to local changes in images, so false positives easily occur using histograms. Though the histogram is easy to compute and seemingly effective, it is liable to cause false positive matches, especially where databases are large, and is not robust to large appearance changes. Another disadvantage of the color histogram is insensitivity to illumination changes. Recently, several approaches have attempted to improve upon the histogram by incorporating spatial information with color. Many of these methods are still unable to handle large changes in appearance. For instance, the color coherence vector (CCV) method uses the image feature(s), e.g. spatial coherence of colors and pixel position, to refine the histogram. These additional features improve performance, but also require increased storage and computation time.

The image subregion retrieval system should also be able to solve the location problem, i.e. the system should be able to find the location of the object in the image. The location problem arises in tasks such as real-time object tracking and video searching, where it is necessary to localize the position of an object in a sequence of frames.

Template matching is one approach used to solve the location problem. This method generally yields good results but is computationally expensive. A refined form of template matching is the histogram backprojection method. The method of histogram backprojection is to first compute a "goodness value" for each pixel in an image (the goodness of each pixel is the likelihood that this pixel is in the target) and then to obtain the subimage and therefore the location whose pixels have the highest goodness values. Histogram backprojection however gives the same goodness value to all pixels of the same color. The technique emphasizes colors that appear frequently in the image. This may result in overemphasizing certain colors in the object Q. If the image has a subimage that has many pixels of color c, then this method tends to identify Q with this subimage, even though the two objects may be unrelated, thus causing an error in some cases.

Another task requiring object retrieval from images is cut detection in video processing. Cut detection is the process of segmenting a video into different camera shots which allows the extraction of key frames for video parsing and querying.

A flexible tool for browsing video databases should also provide users with the capability to place object-level queries that have semantic content, such as "track this person in a sequence of video". To handle to queries, the system has to find which frames contain the specific object or person, and has to locate the object in those frames.

It remains desirable to have an efficient and accurate means of identifying and retrieving objects in images which allows for changes in the appearance of the image content such as viewing angle and magnification.

It is therefore an object of the present invention to provide a method and apparatus to perform efficient image comparisons in order to retrieve objects in images.

It is a further object of the present invention to provide a method and apparatus to provide to perform image comparisons for image subregion querying which allow for significant changes in the image such as viewing position, background, and focus.

It is another object of the present invention to provide a method and apparatus which enables efficient image subregion retrieval from a database.

SUMMARY OF THE INVENTION

The objects set forth above as well as further and other objects and advantages of the present invention are achieved by the embodiments of the invention described hereinbelow.

The problems of image retrieval are solved by the present invention of providing and using a color correlogram to query objects in images. The color correlogram of the present invention is a three-dimensional representation indexed by color and distance between pixels which expresses how the spatial correlation of color changes with distance in a stored image. The color correlogram includes spatial correlation of colors, combines both the global and local distributions of colors, is easy to compute, and is small from a data storage perspective. The color correlogram is robust in tolerating large changes in the appearance of a scene caused by changes in viewing positions, changes in the background scene, partial occlusions, and magnification that causes radical changes in shape.

To create a color correlogram, the colors in the image are quantized into m color values, $c_1 \ldots c_m$. Also, the distance values $k \epsilon [d]$ to be used in the correlogram are determined where [d] is the set of distances between pixels in the image, and where dmax is the maximum distance measurement between pixels in the image. Each entry in the color correlogram is the probability of finding a pixel of color $c_j$ at a selected distance k from a pixel of color $c_i$.

A color autocorrelogram, as provided in this invention, is a restricted version of the color correlogram that considers color pairs of the form (i,i) only.

The color correlogram may be used to query objects in images as well as entire images stored in a database. Extensions to the color correlogram may also be used in object retrieval tasks. The general theme behind the extensions are the improvement of storage efficiency of the correlogram without compromising the image discrimination capability of the correlogram and the use of additional information (such as an edge) to further refine the correlogram which improves image retrieval performance.

The correlogram intersection is used for image subregion querying. Using the correlogram intersection, the relative counts of color pairs in the images being compared are determined. The comparison easily eliminates the images which do not match.

The correlogram may also be used in locating objects in images. The location problem arises in tasks such as real-time object tracking or video searching, where it is necessary to localize the position of an object in a sequence of frames. Efficiency is also required in location because large amounts of data must be processed.

Any norm for comparing vectors, for example the standard $L_1$ norm, may be used to compare color correlograms/color autocorrelograms.

Experimental evidence shows that the color correlogram outperforms not only color histograms but also more recent histogram refinements such as the color coherence vector method for image indexing and retrieval.

The present invention together with the above and other advantages may best be understood from the following detailed description of the embodiments of the invention illustrated in the drawings, wherein:

DETAILED DESCRIPTION OF THE PREFERRED EMBODIMENTS

Figure 1:
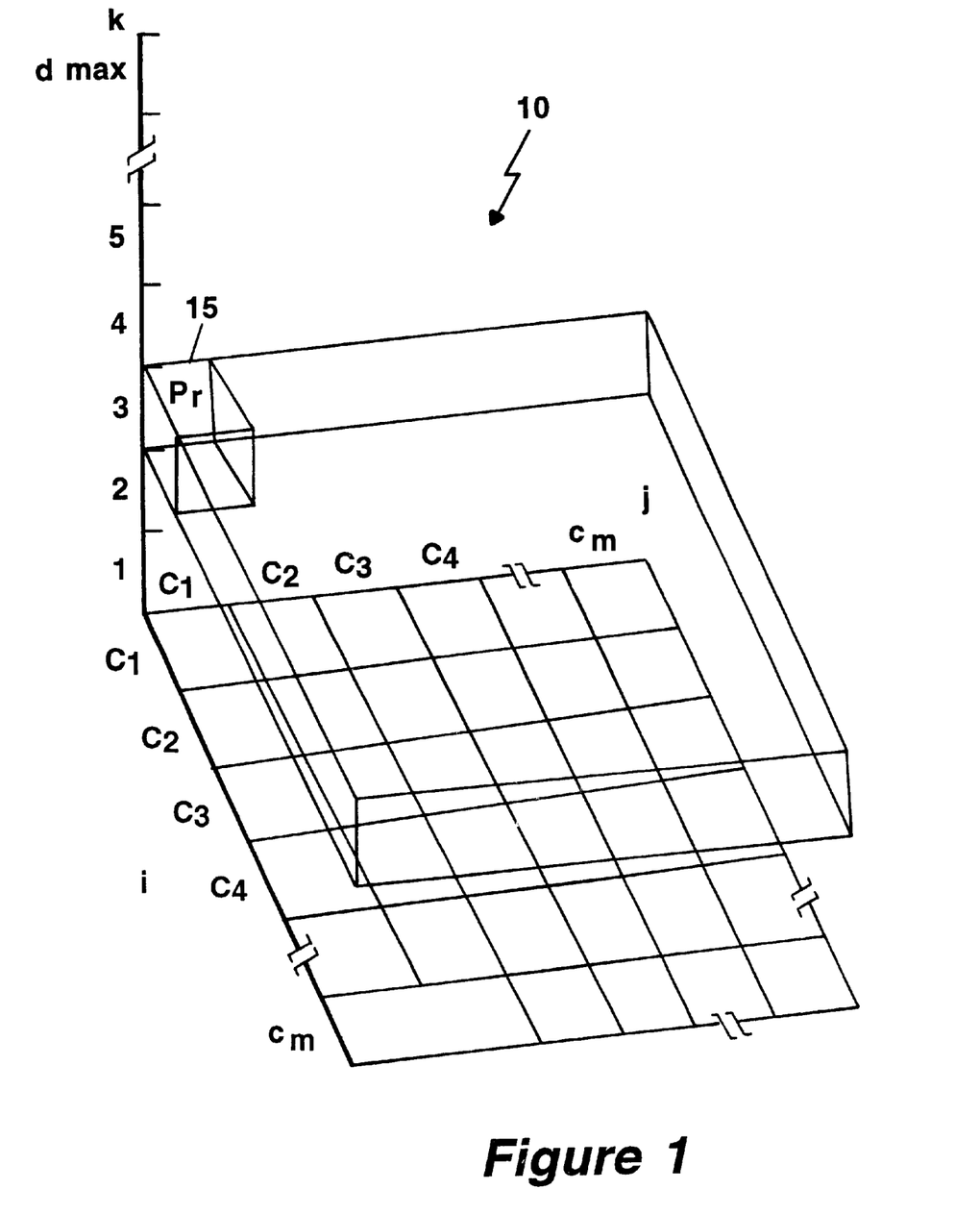
FIG. 1 is a graphic representation of a color correlogram according to principles of the invention.

FIG. 1 illustrates a graphic representation of the color correlogram 10 of the present invention. The color correlogram 10 is a three-dimensional table indexed by color value i, color value j, and by distance k between pixels in an image. The color correlogram 10 expresses how the spatial correlation of color changes with distance in the image.

The spatial correlation of color in a particular image is a feature which may be used to distinguish the image from other images. Putting the spatial correlation of colors data into the format of the color correlogram creates a data object associated with the image which may be stored in a database and queried. The color correlogram embodies color characteristics of an image in a way which distinguishes the image from other images while tolerating large changes in appearance of the image content due to changes in, but not limited to, viewing positions, changes in the background scene, partial occlusions, and camera zoom that causes radical changes in shape. In sum, the color correlogram of the present invention includes spatial correlation of colors, combines both the global and local distributions of colors, is easy to compute, and is small from a data storage perspective.

Figure 2:
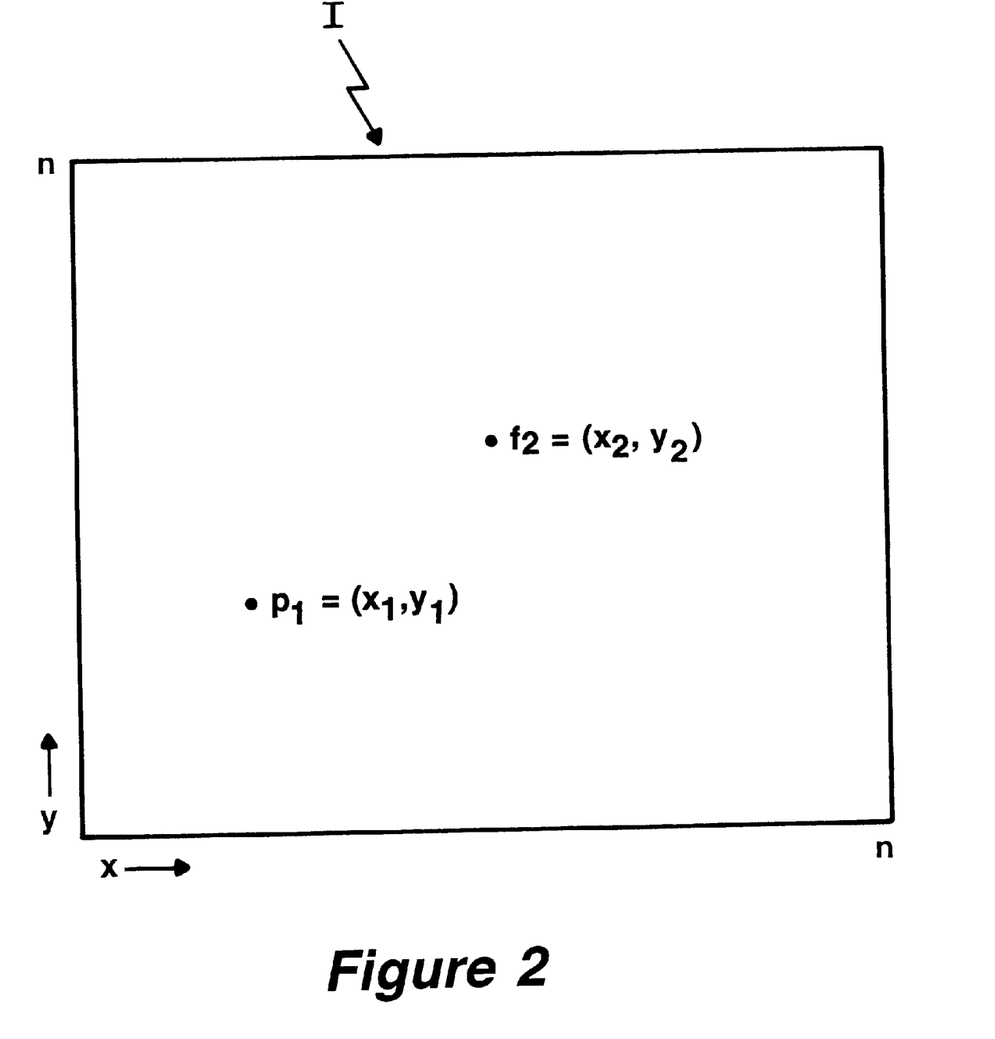
FIG. 2 is an image I.

To create a color correlogram as defined in this invention, the colors in the image are quantized into m color values, $c_1 \ldots c_m$. Also, the distance values $D \subseteq [d]$ to be used in the correlogram are determined where [d] is the set of distances between pixels in the image, and where dmax is the maximum distance measurement between pixels in the image. In FIG. 2, an image I, for example, is an n×n matrix (square for the sake of simplicity). The distance between pixels $p_1$ and $p_2$, where $p_1 = (x_1, y_1)$ and $p_2 = (x_2, y_2)$, is $$|P_1 - P_2| = \max\{|x_1 - x_2|, |y_1 - y_2|\} \quad (1).$$

The image I has a set of values of distances between pixels [d], the maximum value of d being the largest distance between pixels in the image.

The color values and distances are used to index the correlogram as shown in FIG. 1. The value in each entry ($c_i$, $c_j$, k) of the correlogram 10, such as the entry ($c_1$, $c_1$, 3) 15, is the probability Pr of finding a pixel of a color value $c_j$ at a distance k away from a pixel of color value $c_i$.

A color autocorrelogram may also be used with the concepts of this invention to distinguish an image from other images. The color autocorrelogram is a restricted version of the color correlogram that considers only same-color pairs, that is color values of the form ($c_i$, $c_i$). A comprehensive correlogram identification of the image I involves calculating correlograms from a number of distances k from the set of [d] for all of the quantized color pairs ($c_i$, $c_j$). Experimental evidence has indicated, however, that only the autocorrelogram, which uses same color-value color-pairs, and a few values of k are needed to produce a useful image identifier.

Figure 3:
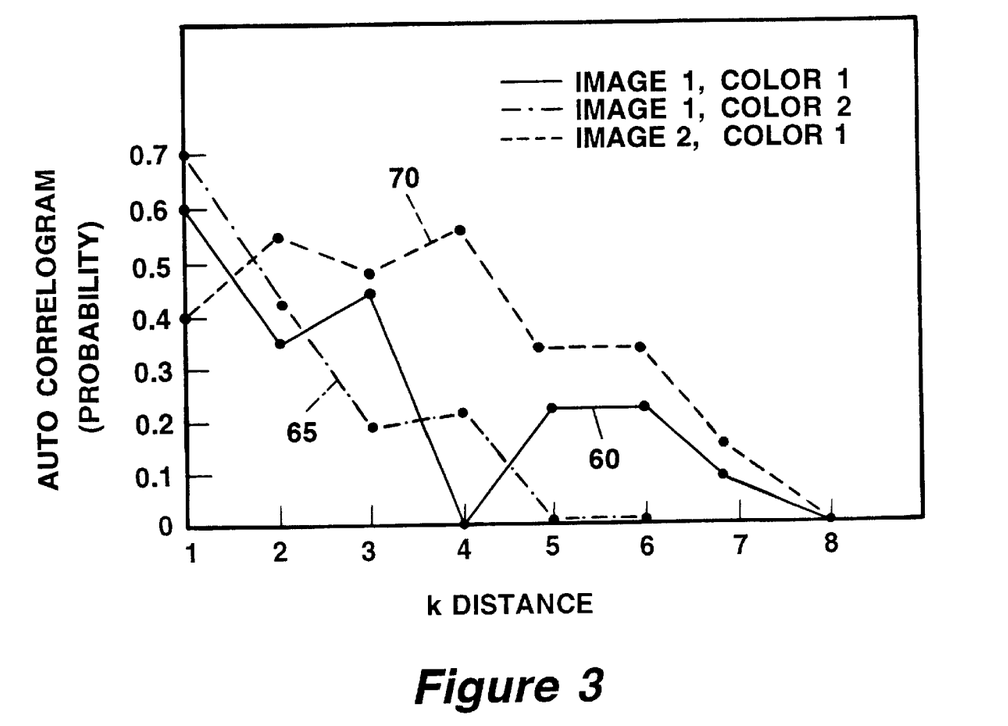
FIG. 3 is a graphical representation of a plurality of autocorrelograms according to principles of the present invention; and, FIG. 4 is a flow chart of the process of retrieving from a database images matching a query image using the color correlogram according to principles of the present invention.

The simplified nature of the autocorrelogram facilitates a two-dimensional representation which is shown graphically in FIG. 3. FIG. 3 shows several example autocorrelograms where probability is plotted against distance k. The solid line 60 in the graph is representative of the autocorrelogram for a first color value in a first exemplary image. The dot-dash line 65 in the graph yields the autocorrelogram for a second color in the first exemplary image. The dotted line 70 in the graph gives the autocorrelogram for the first color in a second exemplary image. The images are identifiable from their correlogram and may be compared using their correlograms.

Referring once again to FIG. 1, the straightforward method for calculating the color correlogram of this invention, is to take a first pixel of the color $c_i$ in the image I, and for each selected k in the set of [d], to count all pixels of color $c_j$ which are k distance away from the first pixel. This process is repeated for each pixel in the image over all of the selected values k in the set of [d]. This method takes a long time.

To reduce the time of the correlogram calculation, the following algorithm is used.

First, $I_c$ is defined as an n×n 0-1 matrix such that $I_c(p)=1 \Leftrightarrow I(p)=c$. This quantity represents those pixels in the image of color c. Then the following quantities are defined:

$$\lambda_{(x,y)}^{c,h}(k) \colon |\{(x+i,y) \ni I_c | 0 \leq i \leq k\}| \quad (2)$$

$$\lambda_{(x,y)}^{c,v}(k) \colon |\{(x,y+i) \ni I_c | 0 \leq j \leq k\}| \quad (3)$$

These quantities count the number of pixels of a given color c within a given distance k from a fixed pixel (x,y) in the positive horizontal and vertical directions.

These expressions, equations 2 and 3, represent a restricted count the number of pixels of a particular color within a specified distance k from a selected pixel in the positive horizontal and vertical directions instead of all the pixels in a radius around the first pixel as described above.

The method of calculating the color correlogram works by first computing $\lambda_p^{cj,v}$ and $\lambda_p^{cj,h}$ where pixel p=(x,y).

$$\lambda_{(x,y)}^{c,h}(k)=\lambda_{(x,y)}^{c,h}(k-1)+\lambda_{(x+k,y)}^{c,h}(0) \quad (4)$$

with the initial condition $\lambda_p^{cj,h}(0)=1$ if $p \in I_c$ and for each k=1 . . . d using equation 4.

In a similar manner, $\lambda_p^{c,v}$ can also be efficiently computed. The modulo boundaries are defined as follows:

$$\Lambda_{ci,cj}^{k(i)}=\Sigma_{(x,y)}(\lambda_{(x-k,y-k+1)}^{cj,v}(2k-2)+\lambda_{(x-k,y-k)}^{cj,h}(2k)+\lambda_{(x-k,y+k)}^{cj,h}(2k)+\lambda_{(x+k,y-k+1)}^{cj,v}(2k-2)) \quad (5)$$

from which the correlogram entry $(c_i,c_j,k)$ can be computed as $\Lambda_{ci,cj}^{k(i)} \div (8k \cdot H_{c_i}(i))$ where $H_{c_i}$ is the number of pixels of the color $c_i$ in the image.

As stated above, the color correlogram and the autocorrelogram may be stored in a database and queried in order to identify matching images.

Figure 4:
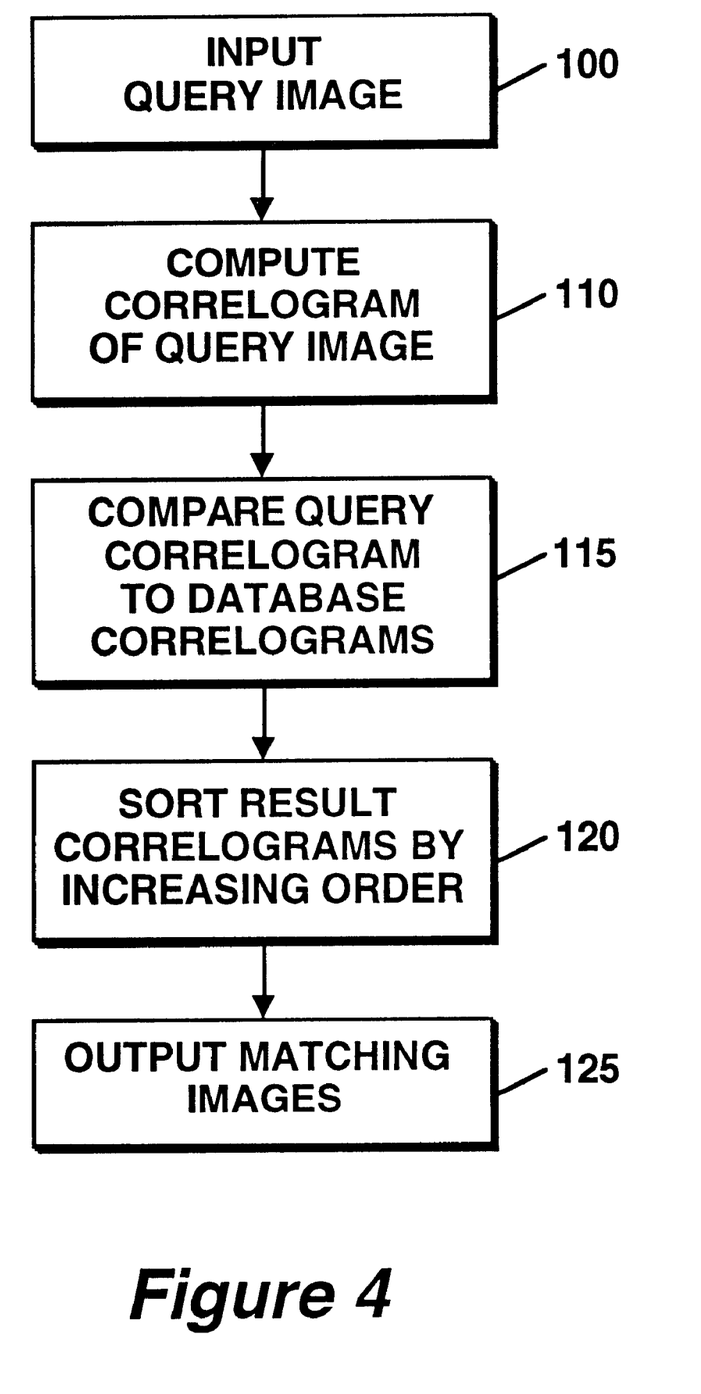

FIG. 4 shows a flow chart of the method of this invention of image retrieval, using color correlograms, from a database having stored color correlograms. First, an input query image is provided, block 100. The correlogram of the input query image is computed, block 110, using one of the methods described above, depending on the type of correlograms stored in the database. Then the correlogram of the input query image is compared to the correlograms stored in the database, block 115. In the present embodiment of the invention, the standard $L_1$ norm is used to compare color correlograms and color autocorrelograms however any method for comparing vectors may be used. The $L_1$ distance, commonly used to compare vectors, is the sum of absolute differences of the components of the vectors being compared. The relative distance between two numbers x and y is given by the expression $|x-y|/(1+x+y)$. The relative distance measure calculates the sum of the relative differences of the components of the vectors and in most cases performs better than the absolute measure. The resulting distances are sorted by increasing order, block 120. Generally, a number of top matches is preselected and this number of images are presented as an output of images matching the input query image, block 125.

The color correlogram may be used to query objects in images as well as entire images stored in a database. The image subregion querying problem may be defined as follows: given as an input a subregion query Q of an image I and an image set S, retrieve from S those images Q' in which the query Q appears according to human perception (denoted Q'⊆Q). The set of images might consist of a database of still images, or videos, or some combination of both. The problem is made even more difficult than image retrieval by a wide variety of effects on the appearance of an object, such as changing viewpoint, camera noise and occlusion.

A solution to the image subregion querying problem is the intersection correlogram. The intersection correlogram is defined as the correlogram of the intersection Q∩I. The color pair count in the nonintersection correlogram is defined as:

$$\Gamma_{C_i,C_j}^{(k)}(Q \cap I)=\min\{\Gamma_{C_i,C_j}^{(k)}(Q), \Gamma_{C_i,C_j}^{(k)}(I)\} \quad (6)$$

Using this the intersection correlogram is defined as:

$$\gamma_{C_i,C_j}^{(k)}(Q \cap I) \equiv \frac{\Gamma_{C_i,C_j}^{(k)}(Q \cap I)}{H_{C_i}(Q \cap I) \cdot 8k} \quad (7)$$

The presence of object Q in I is measured by the distance $$|Q - Q \cap I|_{y,L_1} \quad (8)$$

If $Q \subseteq I$, then the image I should have at least as many counts of correlating color pairs as the object Q. Thus the counts Γ and H for Q∩I becomes exactly the correlogram of Q, giving $|Q-Q\cap I|_{y,L_1}=0$. In other words, where the difference between the correlogram of the object Q and the intersection correlogram of the object Q and the image I is zero, there is a match of the object Q with the image I.

The distance between Q and Q∩I vanishes when Q is actually a subset of I. This affirms the fact that the correlogram is a stable property of images. The stability of the correlogram, however, is not satisfied by all image features. For example, spatial coherence is not preserved under subset operations.

The color correlogram may also be used to find the location of an object in an image. The location problem may be defined as follows: given a query image (also called a target or a model) Q and an image I such that $Q \subseteq I$, find the location in I where Q is present. The mathematical location is defined at the center of the target for convenience.

To locate objects in an image, a correlogram backprojection is combined with a correlogram correction in order to incorporate local spatial correlation information. The objective is to integrate discriminating local characteristics while avoiding local color template matching. To create a color correlogram backprojection, the image and the image object are correlogrammed according to the principles of the present invention. Then, each color value is assigned a frequency value according to how often the color value appears in the object versus the background of the image in which the object appears. The frequency values are backprojected into the image so that each point in the resulting image correlogram has a color-frequency value as well as a color value, the color-frequency value representing the degree to which a particular color is a useful object indicator.

A local correlogram contribution is defined by the autocorrelogram of the subimage $I|_P$ so that the goodness of a pixel depends on its position in addition to its color.

For each pixel $p \in I$, the local autocorrelogram $\alpha_P^{(k)}$ is computed for each distance $k \in [d]$ ([d] should contain only small values so that $\alpha_P^{(k)}$ captures local information for each pixel). The contribution of p is the $L_1$-similarity between the local autocorrelogram at p and the part of the autocorrelogram for Q that corresponds to the color of p. A final goodness value of a subimage $I|_P$, that is the values to be back-projected onto the image, is given by the equation $$\Pi_P(I|Q) \equiv \Sigma_{q \in I|_P}(\beta \pi_{I(q),h}(I|Q) + (1-\beta) \pi_{q,y}(I|Q)) \quad (9)$$

where $0 \leq \beta \leq 1$.

The correlogram contribution to correlogram correction by itself is sensitive and may in some cases overemphasize less dominant colors. $C_b$ is defined as a less dominant color, e.g. the background color, that has a high autocorrelogram. If image I has a subimage $I|_P$ (which may be totally irrelevant to object Q) that has many pixels of color $c_b$ with high autocorrelations, then the correlogram backprojection has a tendency to identify Q with $I|_P$ thus causing an error. Because the problems with histograms and correlograms are somewhat complementary to each other, the best results are obtained when the goodness of a pixel is given by a weighted linear combination of the histogram and correlogram backprojection contributions. This is called a correlogram correction. The color histogram is known in the art. The best weight can be determined by experimental means and is dependent on the particular application and the database being used.

The increasing availability of video data makes automated video analysis a necessity. The step to automate video content analysis is to segment a video into camera shots (also known as key frame extraction). A camera shot is an unbroken sequence of frames from one camera and a cut is said to occur when two consecutive frames are from different shots.

Cut detection algorithms usually work as follows: adjacent frames are compared using some image feature and frames that are sufficiently similar are assumed to belong to the same shot, and dissimilar frames are taken to signify a cut. Different cut detectors use different features to compute the similarity between consecutive frames, e.g. pixel difference, statistical differences, histogram comparisons, edge differences. Correlograms have been shown to be robust to large appearance changes for image retrieval and correlograms are used for cut detection.

In a sequence of video frames that have some number of cuts in the sequence, a pair of adjacent images are evaluated using color correlograms using a preselected feature f to determine if the cut occurs between the two images. If the frames do not match according to the feature f, then the cut does occur between the two adjacent images.

It is to be understood that the above-described embodiments are simply illustrative of the principles of the invention. Various and other modifications and changes may be made by those skilled in the art which will embody the principles of the invention and fall within the spirit and scope thereof:

What is claimed is:

1. A computer-implemented method for retrieving an image object from a plurality of images, comprising the steps of:

providing an image object color correlogram;
   providing a plurality of color values;
   selecting a distance value to be used as the distance between pixels, in the image object and in the plurality of images, to be evaluated for color value;
   analyzing said image object according to said color values and said selected distance value;
   determining in response to the analyzing step a probability of finding a pixel of a particular color value at said distance value from a pre-selected pixel of a pre-selected color value;
   entering said probability into the image object color correlogram;
   providing color correlograms for each of said plurality of images; and
   intersecting the image object color correlogram with correlograms of the plurality of images to produce an intersection result,
   wherein the image object is distinguished by the intersection result from the images which do not contain the image object.

2. The method of claim 1 wherein the intersecting step further comprises comparing a count of a first plurality of color pairs in the image object with a count of a second plurality of color pairs in the image, the first plurality of color pairs correlating to the second plurality of color pairs.

3. The method of claim 1 wherein the step of providing color correlograms for each of said plurality of images further comprises storing the provided correlograms in a database.

4. The method of claim 1 further comprising the steps of:
   selecting a plurality of distance values; and
   performing said analyzing step, said determining step and said entering step using said plurality of distance values.

5. A system for retrieving an image object from a plurality of images, comprising:
   means for providing an image object color correlogram;
   means for providing a plurality of color values;
   means for selecting a distance value to be used as the distance between pixels to be evaluated for color value in the image object and in the plurality of images;
   means for analyzing said image object according to said color values and said selected distance value;
   means for determining in response to said means for analyzing, a probability of finding a pixel of a particular color value at said distance value from a pre-selected pixel of a pre-selected color value;
   means for entering said probability into said image object color correlogram;
   means for providing color correlograms for each of said plurality of images; and
   means for intersecting said image object color correlogram with correlograms of the plurality of images to produce an intersection result,
   wherein the image object is distinguished from the images which do not contain the image object by the intersection result.

6. The system of claim 5 wherein said means for intersecting further comprises a means for comparing a count of a first plurality of color pairs in the image object with a count of a second plurality of color pairs in the image, the first plurality of color pairs correlating to the second plurality of color pairs.

7. The system of claim 5 further comprising a database for storing said provided correlograms of said plurality of images.

8. The system of claim 5 further comprising:
   means for selecting a plurality of distance values;
   means for analyzing said image object and said plurality of images according to said color values and said plurality of distance values; and
   means for determining, in response to said analyzing means, a probability of finding a pixel of a particular color value for each of said plurality of distance values from a selected pixel of a selected color value.

9. A computer-implemented method of locating an image object in an image comprising the steps of:

providing a plurality of color values and at least one distance value;

computing a color correlogram for the image object using the plurality of color values and the at least one distance value;

computing a color correlogram for the image using the plurality of color values and the at least one distance value;

analyzing the image object and the image to determine a color frequency value for each color value;

assigning the color-frequency value to each pixel in the image object to make a back-projection image object correlogram; and combining the back-projection image object correlogram with the image correlogram to create a correlogram backprojection indicating the location of the image object in the image.

10. The method of claim 9 wherein said step of computing the image object color correlogram further comprises computing an autocorrelogram for the image object; and said step of computing the image color correlogram further comprises computing an autocorrelogram for the image.

11. The method of claim 9 further comprising the step of:

locating the image object by the mathematical center of the image object.

12. The method of claim 9 further comprising the step of:

combining the back-projection image object correlogram with a color histogram of the image object to obtain correction values; and combining the correction values with the color correlogram of the image to accurately locate the image object.

13. The method of claim 12 further comprising the step of weighting the values of the back-projection image object correlogram and weighting the values of the color histogram to produce weighted correction values to be combined with the color correlogram of the image.

14. A system for locating an image object in an image, comprising:

means for providing a plurality of color values and at least one distance value;

means for computing a color correlogram for the image object using the plurality of color values and the at least one distance value;

means for computing a color correlogram for the image using the plurality of color values and the at least one distance value;

means for analyzing the image object and the image to determine a color frequency value for each color value;

means for assigning the color-frequency value to each pixel in the image object to make a back-projection image object correlogram; and means for combining the back-projection image object correlogram with the image correlogram to create a correlogram backprojection indicating the location of the image object in the image.

15. The system of claim 14 wherein said means for computing the image object color correlogram further comprises means for computing an autocorrelogram for the image object; and said means for computing the image color correlogram further comprises means for computing an autocorrelogram for the image.

16. The system of claim 14 further comprising:

means for combining the back-projection image object correlogram with a color histogram of the image object to obtain correction values; and means for combining the correction values with the color correlogram of the image to accurately locate the image object.

17. The system of claim 16 further comprising:

means for weighting the values of the back-projection image object correlogram;

means for weighting the values of the color histogram to produce weighted correction values to be combined with the color correlogram of the image.

18. A method for detecting cuts in a sequence of video frames comprising the steps of:

providing an image object;

computing a color correlogram of the image object;

computing a color correlogram of a first video frame;

intersecting the image object color correlogram with the first video frame color correlogram to obtain a first result determining the presence or absence of the image object in the first video frame;

computing a color correlogram of a second video frame, the second video frame being adjacent to the first video frame in the sequence of video frames;

intersecting the image object color correlogram with the second video frame color correlogram to obtain a second result determining the presence or absence of the image object in the second video frame; and, comparing the first result with the second result in order to determine a cut between the first video frame and the second video frame, wherein a cut occurs where the image object is present in one of the adjacent video frames and not present in the other adjacent video frame.

* * * * *